Aug. 21, 1951
G. D. HARDING ET AL
2,565,307
CABLE TESTING SET
Filed May 9, 1950
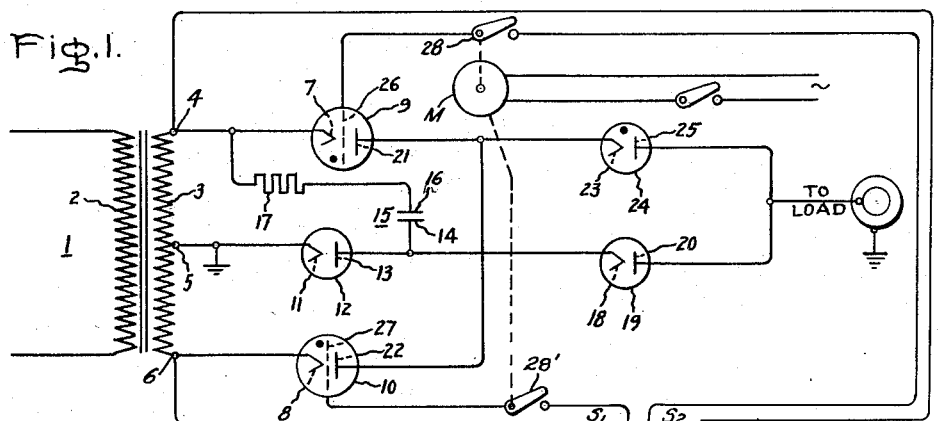
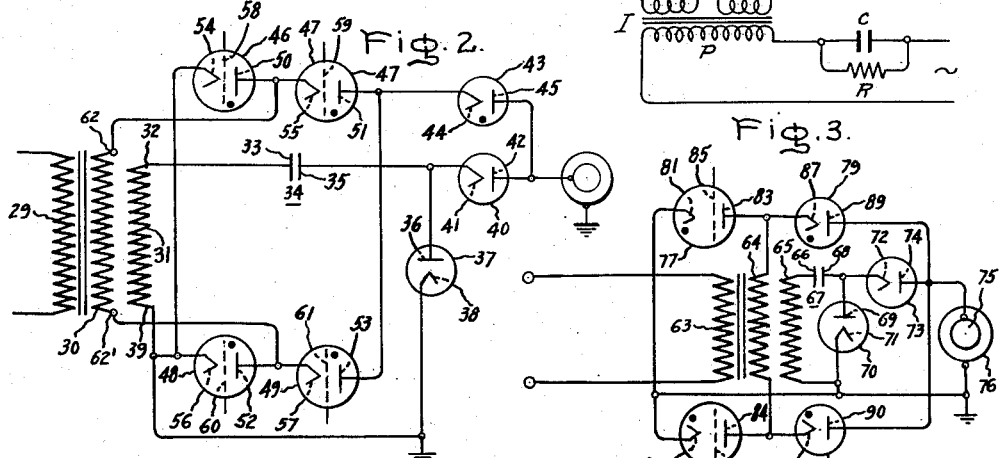
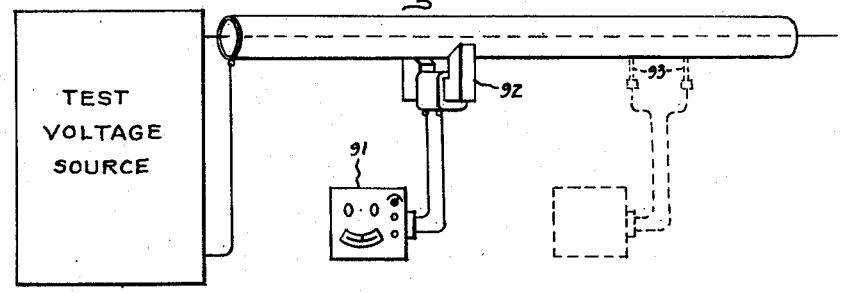
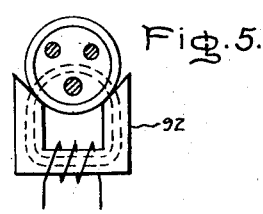
Inventors:
George D. Harding,
Robert W. Barker,
by *Ernest C. Britton*
Their Attorney.

Patented Aug. 21, 1951

2,565,307

UNITED STATES PATENT OFFICE 2,565,307

CABLE TESTING SET

George D. Harding, Syracuse, N. Y., and Robert W. Barker, Pittsfield, Mass., assignors to General Electric Company, a corporation of New York Application May 9, 1950, Serial No. 161,006

4 Claims. (Cl. 175—183)

This invention relates to electrical testing apparatus, and more particularly to devices for locating faults in electrical cables.

In the distribution of electrical power, one of the most troublesome problems which is encountered is that of detecting the location of faults in underground electrical cables. It can readily be appreciated that when an electrical fault, such as a high-resistance ground from the conductor to the concentric cable sheath occurs in a cable which may run for miles between the generating station and the point of fault, a considerable problem is presented in the detection of such a fault.

It is an object of this invention to provide a convenient and easily operable means for the detection of cable faults.

It is a further object of this invention to provide an apparatus for detecting cable faults which provides a high voltage for reducing or breaking-down the fault, and subsequently a high current through the fault to permit ready detection thereof.

In accordance with these objectives, this invention provides an electronic testing apparatus comprising high voltage thermionic vacuum rectifier tubes for supplying a high direct current voltage in order to partially reduce or break down the fault by carbonization at the point of fault, and also low voltage grid-actuated gas-filled thyratron tubes having a high current-carrying capacity, with means for automatically connecting the thyratron tubes to the cable after the cable fault has been partially carbonized. This automatic switching operation permits the passage of a higher current through the cable fault, thereby greatly facilitating carbonization of the fault and localization of the fault.

The features of this invention which we believe to be novel are set forth with particularity in the appended claims. Our invention itself, however, both as to its organization and use, together with further objects and advantages thereof, may best be understood by reference to the following description taken in connection with the accompanying drawing in which Fig. 1 is a circuit diagram of the electrical arrangement of our cable testing apparatus; Figs. 2 and 3 are diagrams of modified circuits in accordance with our invention; Fig. 4 is a schematic illustration showing how our apparatus is applied to testing a cable fault; while Fig. 5 is a detail view of the sector coil used in connection with the fault location.

The fundamental theory of operation in detecting a high resistance cable fault using apparatus in accordance with our invention, is to first apply a relatively high direct current voltages to the cable, with one side of the voltage being applied to the conductor, and the other side of the voltage being applied to the cable sheath. This high voltage will cause a reduction or breaking-down of the fault from one of very high resistance to one of relatively low resistance, due to carbonization at the point of fault. After this fault reduction or lowering of the fault resistance has occurred the resistance of the fault will be sufficiently low to allow a relatively high current to pass through the fault from the conductor to the outer sheath of the cable. The passage of this relatively larger current through the outer sheath of the cable permits a detecting means, such as a portable galvanometer, to be placed along various points of the cable in order to ascertain the exact location of the fault.

In the operation of the apparatus in accordance with our invention the relatively high direct current voltage which is first applied to carbonize the fault is produced by high voltage rectifier thermionic vacuum tubes. The vacuum tubes used are designed to operate at high voltages, of the magnitude, for example, of 50,000 to 150,000 volts, depending upon the physical dimensions of the particular tubes which are used, and also upon the particular circuit arrangement of the tubes with respect to one another. However, these high voltage vacuum tubes have the operating limitation that their current output is relatively small, being of the order of 100 to 250 milliamperes. Thus, while high voltage vacuum tubes are ideal for partially reducing or breaking down the fault of the cable by carbonization, they cannot satisfactorily supply a sufficient current to more completely carbonize the fault and to enable localization of the fault after the fault has been carbonized. Hence, it is frequently necessary in testing for cable faults to switch from a high-voltage, low-current source to a low-voltage-high current source. Under systems presently in use, this switching operation usually involves an interruption of the current to the fault during the switching operation. Such an arrangement is unsatisfactory, particularly in the testing of oil-filled cables where interruption of the current tends to increase the fault resistance due to the insulating action of the oil. Therefore, it is desirable in testing for cable faults to have means for automatically connecting a high-current-capacity supply source to the cable when the fault has been reduced to a predetermined resistance value, while still maintaining the connection of the low current capacity source to the cable.

In accordance with our invention, a device is provided for automatic switching after the fault resistance has been reduced, so that low-voltage, high-current-capacity thyratron rectifier tubes are connected to the cable without interruption of current through the fault.

If the cable fault is initially one of low resistance the automatic switching device of our invention causes the high current capacity thyratron tubes to be connected to the cable at the very beginning of the testing operation.

There is shown in Fig. 1 a circuit in accordance with our invention utilizing two diode vacuum rectifier tubes for the initial high-voltage low current supply, two low-voltage, high-current-capacity thyratron tubes for the later phase of the testing operation, and one gas-filled diode tube which serves as a switch to connect the thyratron tubes to the cable.

Referring now to the drawing, there is shown in Fig. 1 an input transformer 1 having a primary side 2 and a secondary side 3. The two ends of the secondary winding are designated as 4 and 6 respectively, while the grounded midpoint of the secondary is designated as 5. Connected to the respective ends 4 and 6 of the secondary winding are cathodes 7 and 8 of grid-actuated thyratron gas tubes 9 and 10. As will be hereinafter explained, thyratron tubes 9 and 10 in accordance with our invention, supply a relatively heavy load current through the cable fault during the later stage of the fault reduction and fault detection process.

Connected to the grounded midpoint 5 of the secondary 3 of the transformer is the cathode 11 of a vacuum diode rectifier tube 12. The plate or anode 13 of vacuum tube 12 is connected to one side 14 of a capacitor 15, the other side 16 of which is connected to a resistance 17 which, in turn, is connected to end 4 of the secondary winding 3. The resistance 17 is included in the line from the capacitor 15 to the end 4 of the secondary winding, in order to limit the current through the capacitor 15 to a desired value, or the capacitance value of capacitor 15, if small, will of itself limit the current through it to the desired value.

The anode 13 of vacuum tube 12 is also connected to the cathode 18 of a similar vacuum diode rectifier tube 19. Plate or anode 20 of vacuum rectifier tube 19 is connected directly to one side of the cable which is being tested.

Referring again to the gas-filled thyratron tubes 9 and 10 the cathodes 7 and 8 of which are respectively connected to the opposite ends 4 and 6 of the secondary winding 3 of transformer 1, it will be noted that the anodes 21 and 22 of tubes 9 and 10, respectively, are connected to the cathode 23 of tube 24 which is a gas-filled diode, commonly referred to as a phanotron tube. The plate or anode 25 of tube 24 is connected to the anode 20 of vacuum rectifier tube 19, with both anodes being connected to the output circuit across which the cable to be tested is placed. As will be explained hereinafter, gas-filled diode tube 24 functions as a switch to connect gas-filled thyratron tubes 9 and 10 to the cable after the cable fault has been partially carbonized and a relatively high current is required in order to complete carbonization and to localize the cable fault.

Proceeding now to a detailed description of the operation of the circuit shown in Fig. 1, and assuming that a voltage 2V is placed across the secondary winding 3 between points 4 and 6, it will be seen that the voltage between points 4 and 5 and 5 and 6 respectively will be equal to V, since point 5 is the grounded midpoint of the transformer secondary. Although the tubes 9 and 10 are only connected across one-half of the secondary winding, namely, between points 4 and 5, they are provided with a voltage doubler circuit arrangement so that the resultant output of these tubes is 2V.

During the half cycle of applied voltage when point 4 is positive and point 6 of the secondary winding is negative, the anode 13 of vacuum rectifier tube 12 becomes positive with respect to cathode 11 of that tube. Hence a current is caused to flow from the negative cathode to the more positive anode. This will cause capacitor 15 to become charged with voltage of approximately V, with capacitor plate 16 being positive and capacitor plate 14 being negative. On the next half cycle of applied voltage, point 4 of the secondary winding becomes negative and point 6 becomes positive. Point 5, the grounded midpoint of the transformer, will be at a positive potential of V with respect to point 4. In series with this voltage is the voltage across the capacitor 15, which, as has been explained, was charged during the previous half cycle when point 4 was at a positive potential with respect to points 5 and 6 of the secondary winding. The secondary winding voltage between points 5—4 is in additive relation with the voltage of capacitor 15 since capacitor plate 16 is positively charged and capacitor plate 14 is negatively charged. Thus, it will be seen that cathode 18 of vacuum rectifier tube 19 is at a voltage of approximately minus 2V with respect to the grounded midpoint 5 of the secondary winding. Since the anode or plate 20 of tube 19 is connected to grounded midpoint 5 of the secondary winding through the cable fault, as will be seen in Fig. 1, it follows that anode 20 is positive with respect to cathode 18 at this instant, and hence there will be a flow of current through the anode 20, through the cable fault, and back to the grounded midpoint 5 of the secondary of the transformer. When this happens, capacitor 15 will discharge, to be recharged again on the next half cycle, when point 4 again becomes positive with respect to points 5 and 6 of the secondary winding.

Thus, it will be seen that on the half cycle of voltage when point 4 is positive with respect to points 5 and 6, there will be a current flow in the anode circuit of vacuum rectifier tube 12 which will result in the charging of capacitor 15 in that circuit to a voltage of approximately V. On the following half cycle, when point 4 becomes negative with respect to points 5 and 6, the cathode 18 of tube 19 will be at a potential of minus 2V with respect to the grounded midpoint 5 of the secondary of the transformer due to the series addition of half the secondary voltage plus the capacitor voltage, and there will be a flow of current at a potential of 2V through the anode 20 of tube 19, through the cable fault and back to the grounded midpoint 5.

Since the voltage drop between the cathode 18 and anode 20 of tube 19 is very small at light current-carrying loads, with practically the entire voltage drop being across the cable fault itself, it can be assumed that the plate 20 is at a potential of minus 2V with respect to the grounded midpoint 5 of the secondary of the transformer as soon as conduction has started through tube 19.

In accordance with our invention, the plate 20 of tube 19 is connected directly to the plate 25 of gas-filled diode 24 which, as has been explained hereinbefore, acts as a switch to throw gas-filled thyratron tubes 9 and 10 across the load when a large current-carrying capacity is required. The cathode 23 of tube 24, although not directly connected to the power supply, will have a voltage somewhere between that of anode 25 and of ground point 5, depending on the relative interelectrode capacitances of tube 24, and of tubes 9 and 10, and also on the capacitance to ground of the leads which join anodes 21 and 22 to cathode 23. In general, it is expected that these relative capacitances will be such that a large share of the total voltage will be across tube 24. In any event, tube 24 must be capable of withstanding almost the entire inverse voltage 2V.

At the same time, anode 25 of gas tube 24 will be at a potential of —2V, since, as has been explained, anode 25 of tube 24 is of the same potential as anode 20 of tube 19. Thus, during the portion of the half cycle when point 4 of the secondary of the transformer is negative and tube 19 is conducting, the cathode 23 of tube 24 will be at a potential of —1V or less while its anode 25 will be at a potential of —2V. When this situation prevails, there will be no conduction through tube 24 since its anode 25 is more negative than its cathode 23.

The capacitance of capacitor 15, if sufficiently low, will limit the current that can be drawn through vacuum tubes 12 and 19, and will determine the regulation characteristics of this portion of the circuit. Ideally, this capacitance is chosen so that by itself it can limit the current through vacuum tubes 12 and 19 to values which are within their peak current and average current ratings, when cable fault resistance has become zero. When this has been done, the regulation characteristics are such that at some current less than that of the rating of tubes 12 and 19, the potential of anode 25 will have become sufficiently positive with respect to cathode 23 that current will automatically begin to flow through thyratron tubes 9 and 10, and gas-filled phanotron tube 24 to the fault. This flow of current will be due to the fact that as the cable resistance fault decreases the voltage at anode 20 of tube 19 will gradually begin to become more positive until finally it will reach a value more positive than —1V. In the meantime, the potential of cathode 23 will remain substantially constant at —1V. Thus, a point will be reached where the potential of anode 25 of tube 24 will become sufficiently less negative than that of cathode 23, that conduction will begin through tube 24, thus connecting thyratron tubes 9 and 10 to the cable fault.

Conduction through tube 24 will provide a path from the anodes 21 and 22 of thyratron gas-filled tubes 9 and 10 to the grounded midpoint 5 of the transformer secondary 3.

The thyratron tubes 9 and 10 provide full wave rectification of the voltage across the secondary 3 of transformer 1, and the conduction path through tube 24 provides a path for the load current which then passes through the cable fault and back to the midpoint 5 of the transformer secondary. However, as is well known in connection with thyratron gas-filled tubes, conduction through these tubes depends upon the potential of the grid of each of the tubes with respect to the cathode of the same tube. Hence, the potential of grids 26 and 27 must be maintained at a voltage which is not too negative with respect to the cathodes 7 and 8 of tubes 9 and 10, respectively, when current flow is desired. In effect, grids 26 and 27 serve as triggers to release the flow of current through tubes 9 and 10.

In testing for cable faults, it is desirable that the tracing current which permits testing for localization of the fault be of an intermittent character, such as, for example, ½ second on and 1½ seconds off, rather than a continuous current. In order to achieve this result, interrupter switches 28 and 28', driven by motor M, control the grid circuits of tubes 9 and 10, alternately connecting the grids 26 and 27 to a source of negative potential with respect to the cathodes 7 and 8. The source of alternating grid potential may be a transformer energized from the same source as transformer 1, but with capacitance and resistance supplied in series with or in parallel with the primary or secondary so that the point to which the grid is connected will become negative with respect to the cathode slightly ahead of the time when the anode becomes positive with respect to the cathode. Motor M is energized manually by an operator when there is indication that carbonization is sufficiently complete to warrant the use of the short pulses of current needed for fault location. Operation of motor M, as has been stated, applies a negative potential to grids 26 and 27 for approximately 1½ seconds out of every 2 seconds, so that during that period the tubes 9 and 10 do not conduct current, and only the low current vacuum tubes 12 and 19 are left to supply current to the fault.

Thus, as shown in Fig. 1, a transformer T has its primary P connected to a suitable alternating current voltage source, having the same frequency as that to which transformer 1 is connected. Transformer P has two secondary windings, $S_1$ and $S_2$, each of which supplies a grid bias to one of the respective control grids 26 and 27. Thus, one end of transformer secondary $S_1$ is connected to grid 27, while the other end of secondary winding $S_1$ is connected to cathode 8. Similarly one end of transformer secondary $S_2$ is connected to control grid 26, while the other end of secondary winding $S_2$ is connected to cathode 4. The polarity connections are such that grid 27 is negative when anode 22 is positive and grid 26 is negative when anode 21 is positive. In fact, due to the connection of capacitor C and resistor R, in parallel with each other, and in series with primary winding P, a slight phase shift is produced which causes the respective grids to become negative with respect to their cathodes slightly ahead of the time when the corresponding anodes become positive with respect to the respective cathodes.

In Fig. 2 there is shown a modified circuit arrangement in which our invention may be utilized, which differs principally from the arrangement of Fig. 1 in that the voltage output for the high current phase of the operation is derived from a rectifier bridge having four gas-filled thyratron tubes, rather than the full wave rectifier using only two tubes as shown in the arrangement of Fig. 1. In addition, the circuit of Fig. 2 provides a separate secondary transformer winding for both the high voltage and low voltage phases of operation; that is, a separate secondary winding energizes the high voltage vacuum tubes with which the cable testing operation is commenced, and another secondary winding energizes the rectifier bridge comprised of the four thyratron tubes heretofore mentioned.

Referring more specifically to the circuit arrangement of Fig. 2, there is shown an input transformer having a primary winding 29 and two secondary windings 30 and 31. Similar to the arrangement of Fig. 1, one end 32 of secondary winding 31 is connected to plate 33 of capacitor 34, with the other plate 35 of the capacitor being connected to anode 36 of vacuum diode rectifier tube 37, the cathode 38 of which is connected to the grounded side 39 of secondary winding 31. On the half cycle of applied voltage when point 32 of secondary winding 31 is positive, there will be a current flow through tube 37 which will cause capacitor 34 to be charged to approximately the voltage V across the secondary winding 31, capacitor plate 33 being positive and capacitor plate 35 being negative. On the following half cycle of applied voltage, when point 32 of secondary winding 31 becomes negative, the capacitor charge of V will be in series with the voltage of the winding 31 so that the cathode 41 of vacuum tube 40 will be at a potential of —2V with respect to ground, and current will flow through the anode 42 of vacuum diode tube 40 to ground through the load, which in this case is the cable which is being tested.

Similar to the arrangement of Fig. 1, tube 43, a gas-filled diode rectifier tube having a cathode 44 and an anode 45 acts as a switch to throw the thyratron rectifier bridge comprised of tubes 46, 47, 48 and 49 across the load when the voltage output of the vacuum diode tubes 37 and 40 decreases to a predetermined level. As has been explained in connection with a similar circuit arrangement of Fig. 1, the cathode 44 of tube 43 will be at a potential of —V or less and anode 45 will be at a potential of —2V when tubes 37 and 40 are operating at a light load. However, as the load applied to the cable fault by tubes 37 and 40 increases, the negative potential on anode 45 of tube 43 will decrease until finally a point is reached where anode 45 of tube 43 will be at a more positive potential than its cathode 44, at which time tube 43 will begin to conduct. When this happens, the output of the thyratron rectifier bridge comprised of tubes 46, 47, 48 and 49, will be connected to the cable, the output voltage being applied between the cable conductor and the grounded cable sheath. As has been explained hereinbefore, the thyratron tubes 46—49 inclusive are capable of producing a much higher current output, although at a lower voltage, than the vacuum tubes 37 and 40.

Thyratron tubes 46—49 inclusive are each respectively provided with an anode numbered 50—53, inclusive, with a cathode numbered 54—57, inclusive, and with a grid numbered 58—61 inclusive. These four tubes are interconnected in a conventional bridge arrangement with anodes 51 and 53 of tubes 47 and 49 connected together, and with cathodes 54 and 56 of tubes 46 and 48 connected together. Anode 50 of tube 46 is connected to cathode 55 of tube 47, while anode 52 of tube 48 is connected to cathode 57 of tube 49. Terminal 62 of transformer secondary 30 is connected to the rectifier bridge at the common connection between anode 50 and cathode 55. Terminal 62' of transformer secondary 30 is connected to the rectifier bridge at the common connection between anode 52 and cathode 57. The load comprised of the cable fault is connected across the bridge between tubes 47 and 49, on one side of the bridge, and between tubes 46 and 48 on the other side of the bridge.

Although not shown in this figure, a similar arrangement to that of Fig. 1 is provided for causing the thyratron tubes 46—49, inclusive, to fire for a predetermined time at definite intervals such as, for example, ½ second out of every 2 seconds. This is accomplished by maintaining the grids of tubes 46—49, inclusive, negative for the necessary parts of the cycle during the period in which it is desired that the thyratron bridge remain non-conducting, and of removing this negative grid potential during the period when it is desired that the bridge be conducting.

There is shown in Fig. 3 a modified circuit arrangement in which the voltage output for the high current phase of the operation is derived from a rectifier bridge utilizing four gas-filled tubes, with two of the tubes being grid-actuated gas-filled thyratrons, and the other two tubes being two-element gas-filled phanotron tubes. In addition, the circuit of Fig. 3 provides a separate secondary tranformer winding for both the high voltage and low voltage phases of operation, as in the circuit arrangement of Fig. 2. That is, a separate secondary winding energizes the high voltage vacuum tubes with which the cable testing operation is commenced, and another secondary winding energizes the rectifier bridge comprised of the two grid-actuated gas-filled thyratron tubes and the two two-element gas-filled phanotron tubes.

Referring more specifically to the circuit arrangement of Fig. 3, there is shown an input transformer having a primary winding 63 and two secondary windings 64 and 65. One end of secondary winding 65 is connected to plate 66 of capacitor 67, with the other plate 68 of capacitor 67 being connected to anode 69 of vacuum diode rectifier tube 70, the cathode 71 of which is connected to the other side of secondary winding 65. Cathode 72 of a second diode vacuum rectifier tube 73 is connected to plate 68 of capacitor 67. Therefore, plate 68 of capacitor 67, anode 69 of vacuum rectifier tube 70 and cathode 72 of vacuum rectifier tube 73 are all at the same potential. Anode 74 of vacuum rectifier tube 73 is connected to the conductor 75 of the cable 76 which is being tested. The outer sheath of the cable is connected to ground as is also cathode 71 of vacuum tube 70. Tubes 70 and 73 in conjunction with capacitor 67 provide a voltage doubler circuit arrangement similar to that shown in Figs. 1 and 2.

In the circuit arrangement of Fig. 3, two gas-filled two-element phanotron tubes are used in conjunction with two gas-filled thyratron tubes in order to provide a rectifier bridge. This permits a net saving of one tube as compared to the rectifier bridge arrangement of Fig. 2 in which the bridge consists of four thyratron tubes, with an additional phanotron tube being used for connecting the thyratron rectifier bridge to the cable.

The rectifier bridge of Fig. 3 is comprised of gas-filled grid-actuated thyratron tubes 77 and 78 and gas-filled diode tubes 79 and 80. Thyratron tubes 77 and 78 are provided with cathodes 81 and 82, anodes 83 and 84, and grids 85 and 86, respectively. Gas-filled diode phanotron tubes 79 and 80 are provided with cathodes 87 and 88, and anodes 89 and 90, respectively.

Anodes 83 and 84 of thyratron tubes 77 and 78, respectively, are connected at opposite ends of transformer secondary 64. Cathodes 87 and 88 of gas-filled diode phanotron tubes 79 and 80 are respectively connected at the same end of transformer secondary 64 as are anodes 83 and 84 of tubes 77 and 78. In order to complete the rectifier bridge, cathodes 81 and 82 of tubes 77 and 78, respectively, are connected to each other, and anodes 89 and 90 of tubes 79 and 80, respectively, are likewise connected to each other. Anodes 89 and 90 of gas-filled diode phanotron tubes 79 and 80 are not only connected to each other, as has been previously mentioned, but are also to anode 74 of vacuum rectifier tube 73. Also cathodes 81 and 82 of thyratron tubes 77 and 78 are not only to each other but also to cathode 71 of vacuum diode rectifier tube 70. Cathodes 81, 82, and 71, of tubes 77, 78, and 70, respectively are all at ground potential. The cable which is being tested is connected across the rectifier bridge. In the circuit of Fig. 3, the conductor 75 inside the cable is connected across the voltage output of anodes 89, 74, and 90, of tubes 79, 73, and 80, respectively. The grounded outer sheath of the cable is at the same potential as cathodes 81, 82, and 71, of tubes 77, 78, and 70, respectively.

Proceeding now to a detailed description of the operation of the circuit shown in Fig. 3, and assuming that a voltage V is placed across the secondary winding 65, it will be seen that during the half cycle of applied voltage when the terminus of secondary winding 65 which is connected to condenser 67 is positive, the anode 69 of vacuum rectifier tube 70 becomes positive with respect to cathode 70 of that tube. Hence, a current is caused to flow from the negative cathode to the more positive anode. This will cause capacitor 67 to become charged with a voltage of approximately V, with capacitor plate 66 being positive and capacitor plate 68 being negative. On the next half cycle of applied voltage, the end of the secondary winding 65 which is connected to the capacitor will become negative and the opposite end of the winding will become positive. At the same instant, cathode 72 of vacuum tube 73 will become negative with respect to anode 74 of that tube since anode 74 is connected to ground and hence to the opposite end of secondary winding 65 through the cable fault resistance. It will be seen that on the half cycle when the end of the secondary connected to the condenser is negative, cathode 72 of tube 73 is at a voltage of —2 V with respect to the grounded end of secondary winding 65. This is due to the fact, as has previously been explained in connection with the circuit of Fig. 1, that the voltage on condenser 67 is in series with the voltage of secondary winding 65. Hence, there will be a flow of current through tube 73, through the cable fault, and back to the grounded terminus of secondary winding 65. When this happens, condenser 67 will be discharged, to be recharged again on the next half cycle, when the secondary winding terminus connected to capacitor 67 again becomes positive.

During the period when the cable fault resistance is relatively high and tubes 70 and 73 are supplying relatively small currents to the cable fault, the potential of anodes 89 and 90 of gas-filled diode phanotron tubes 79 and 80 respectively, will be such as to prevent conduction through tubes 79 and 80. When tubes 79 and 80 are non-conducting, high current, low voltage thyratron tubes 77 and 78 are not connected to the cable fault since, as has been explained hereinbefore, gas-filled diodes 79 and 80 function as switches to connect the high current capacity thyratron tubes to the cable fault. That is, when the terminus of secondary winding 65 connected to condenser 67 is negative and the opposite terminus is positive there is conduction through vacuum tube 73 to the cable fault. At this time, anode 74 of tube 73 is at a potential of approximately —2V with respect to the terminus of secondary winding 65 to which condenser 67 is connected, due to the fact that the voltage drop between the cathode 72 and the anode 74 of vacuum tube 73 is very small at light current loads, with practically the entire voltage drop being across the cable fault itself.

Anodes 89 and 90 of gas-filled diodes 79 and 80, respectively, are connected to each other and to anode 74 of vacuum tube 73. Consequently, these three anodes are all at the same potential. As has been explained previously in connection with similar arrangements in the circuits of Figs. 1 and 2, when the current drawn by the cable fault resistance is small in magnitude, the potential of anodes 89 and 90 will be negative with respect to their respective cathodes 87 and 88. However, as the load current to the cable fault increases, the voltage drop across capacity 67 will affect the potential of anode 74 of tube 73, and consequently the potentials of anodes 89 and 90 in such manner that anodes 89 and 90 will ultimately become positive with respect to their respective cathodes 87 and 88. When this happens, conduction will begin through phanotron gas tubes 79 and 80, so as to connect thyratron gas tubes 77 and 78 to the cable fault. The four tubes 77, 78, 79, and 80 will then function as a full-wave rectifier bridge. On one half-cycle, conduction is through tubes 79 and 78, while on the succeeding half-cycle conduction is through tubes 77 and 80. Although not shown in Fig. 3, a similar arrangement to that of Fig. 1 is provided for causing the thyratron tubes 77 and 78 to fire for a predetermined time at definite intervals such as, for example, ½ second out of every 2 seconds. This is accomplished by maintaining the grids 85 and 86 of thyratron tubes 77 and 78 negative for the necessary parts of the cycle during the period in which it is desired that the thyratron bridge remain non-conducting, and of reversing this negative grid potential during the period when it is desired that the bridge be conducting.

It should be noted that in the circuit arrangements of Figs. 1, 2, and 3 after the two-element gas switch tube begins to conduct both the thyratron tubes and the vacuum tubes will be connected to the cable. The vacuum tubes will continue to supply part of the load current, although this part will be very small in proportion to the total current.

As has been explained hereinbefore, the cable testing apparatus disclosed in Figs. 1, 2, and 3 serves first to provide a relatively high voltage through the vacuum rectifier tubes to break down or carbonize the cable fault. As the cable fault becomes reduced in resistance and an increased current begins to flow, a point will finally be reached where the two-element gas-filled switch tube will throw the high current thyratrons across the cable load, allowing tracing current to be sent through the cable sheath in order to permit localization of the cable fault.

In Fig. 4 is shown a diagrammatic sketch illustrating how the cable fault is localized after the thyratron tubes have been placed across the load and have started to send tracing current through the cable conductor and fault and back through the cable sheath. As will be seen in Fig. 4, the center conductor of the cable is connected to one side of the output voltage, and the cable sheath is connected to the other side of the output voltage. The resistance of the cable fault runs between the conductor and the sheath, and hence is across the output voltage. The tracing current passes through the center conductor, through the fault and then back through the cable sheath. In localizing the fault, a portable galvanometer 91 is first used in conjunction with an exploring coil or "sector" coil 92. A detail view of sector coil 92 is shown in Fig. 5. The sector coil is in series with the galvanometer, and is so designed that it embraces approximately one-third of the sheath circumference of an average three-phase cable. This eliminates the neutralizing effect of the fields produced by any other conductor in a phase-to-phase failure. The tracing current in the conductor sets up a field which causes periodic deflection of the galvanometer field, due to the interaction of this current with the sector coil. This periodic deflection indicates that the point tested is between the station and the fault. As the fault is approached, the galvanometer deflection decreases, because of the neutralizing effect of the return sheath current, the sheath current being much more nearly equal to the conductor current as the fault is approached. When this deflection reaches the minimum value, it indicates that the fault has been passed or that it is in the immediate vicinity.

A pair of test prods 93 is then connected to the galvanometer, replacing the sector coil, and the exact fault position is located by measuring the voltage drop along a short length of the cable sheath. The return current in the sheath flows in both directions from the fault. The direction of galvanometer deflection depends on the direction of sheath current. It will be in one direction on the station side of the fault and in the opposite direction as the fault is passed. The deflection will also increase as the fault is approached. Thus, exact and positive fault location is obtained.

In conclusion, it can be seen that our invention provides an apparatus for testing cable faults which is convenient to operate, and accurate in its fault determination. The circuit which we have invented provides automatic connection of a high current output source to the cable after a predetermined breaking-down of the cable fault by carbonization has occurred, and when a high current is then needed to permit localization of the fault.

While there have been shown and described particular embodiments of our invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In a device for testing faults in electrical cables of the type in which a test potential is applied between a cable conductor and a grounded cable sheath, a transformer, a primary winding on said transformer, a secondary winding on said transformer, the midpoint of said secondary winding being grounded, a first and second two-electrode high voltage vacuum tube each respectively having a cathode and an anode, the cathode of said first vacuum tube being attached to the grounded midpoint of said secondary winding, the anode of said first vacuum tube being connected to one side of a capacitor, the other side of said capacitor being connected to one end of said secondary winding, the anode of said first vacuum tube also being connected to the cathode of said second vacuum tube, the anode of said second vacuum tube being connected to a conductor of the cable which is being tested, said capacitor being charged to substantially one-half said secondary voltage on the half cycle of applied voltage when the end of the transformer to which it is connected becomes positive, said capacitor discharging through said second vacuum tube on the half cycle of applied voltage when the end of the transformer to which said capacitor is connected becomes negative, two three-electrode gas-filled rectifier tubes each respectively having a cathode, an anode and a control grid, the cathode of each of said three-electrode gas-filled rectifier tubes being connected to an opposite end of said secondary winding, a switch means for connecting said three-electrode gas-filled rectifier tubes to said conductor of the cable being tested, said switch means comprising a two-electrode gas-filled tube having a cathode and an anode, each of said three-electrode gas-filled tubes having an anode connected to the cathode of said two-electrode gas tube switch means, the anode of said two-electrode gas tube switch means being connected to the anode of said second vacuum tube, means for periodically applying a negative bias to the control grids of said three-electrode gas-filled tubes, conduction through said two-electrode gas tube switch means being responsive to the anode potential of said vacuum rectifier tube and serving to connect the output voltage between the anodes of said respective three-electrode gas-filled tubes and the grounded midpoint of said transformer secondary across said conductor of said cable and the grounded sheath of said cable.

2. In a device for detecting faults in electrical cables of the type in which a test potential is applied between a cable conductor and a grounded cable sheath, a transformer having a primary winding and a first and a second secondary winding, said primary winding being connected to a source of alternating current potential, a first and a second two-electrode vacuum rectifier tube each having an anode and a cathode, the cathode of said first vacuum rectifier tube being connected to one end of said first secondary winding and to ground, the anode of said first vacuum rectifier tube being connected through a capacitor to an opposite end of said first secondary winding than the point of connection of the cathode of said first vacuum rectifier tube, the anode of said first vacuum rectifier tube also being connected to the cathode of said second vacuum rectifier tube, the anode of said second vacuum rectifier tube being connected to a conductor of the cable which is being tested, a rectifying bridge comprising four three-electrode gas-filled tubes, each of said three-electrode gas-filled tubes having an anode, a cathode, and a control grid, the first and second of said three-electrode gas-filled tubes having their respective cathodes connected together and to ground, the third and fourth of said three-electrode gas-filled tubes having their respective anodes connected together, the anode of said first three-electrode gas-filled tube being connected to the cathode of said third three-electrode gas-filled tube and to one end of said second secondary winding, the anode of said second three-electrode gas-filled tube being connected to the cathode of said fourth three-electrode gas-filled tube and to an opposite end of said second secondary winding than the point of connection of said anode of said first three-electrode gas-filled tube and the cathode of said third three-electrode gas-filled tube, means for periodically applying a negative bias to the respective control grids of said four three-electrode gas-filled tubes, a switch means for connecting said rectifying bridge to said conductor of the cable being tested, said switch means comprising a two-electrode gas-filled tube having a cathode and an anode, the respective anodes of said third and fourth three-electrode gas-filled tubes being connected to the cathode of said two-electrode gas-filled tube switch means, the anode of said two-electrode gas-filled tube switch means being connected to the anode of said second vacuum rectifier tube, conduction through said two-electrode gas-filled tube switch means being responsive to the anode potential of said second vacuum rectifier tube and serving to connect the potential output of said rectifying bridge between the conductor of the cable being tested and the grounded metal sheath of said cable.

3. In a device for detecting faults in electrical cables, of the type in which a test potential is applied between a cable conductor and a grounded cable sheath, a transformer having a primary winding and a first and a second secondary winding, said primary winding being connected to a source of alternating current potential, two two-electrode vacuum rectifier tubes each having an anode and a cathode, the cathode of said first vacuum rectifier tube being connected to one end of said first secondary winding and to ground, a capacitor, the anode of said first vacuum rectifier tube being connected to one side of sai dcapacitor, the other side of said capacitor being connected to the other end of said first secondary winding, the anode of said first vacuum rectifier tube also being connected to the cathode of said second vacuum rectifier tube, the anode of said second vacuum retifier tube being connected to a conductor of the cable which is being tested, a rectifying bridge comprising a first and a second three-electrode gas-filled tube each having an anode, a cathode, and a control grid, and a first and a second two-electrode gas-filled tube each having an anode and a cathode, the anode of said first three-electrode gas-filled tube and the cathode of said first two-electrode gas-filled tube being connected to the same end of said second secondary winding, the anode of said second three-electrode gas-filled tube and the cathode of said second two-electrode gas-filled tube being connected together to the end of said second secondary winding, which is opposite the end to which the anode of said first three-electrode tube and the cathode of said first two-electrode tube are connected, the respective cathodes of said first and second three-electrode gas-filled tubes being connected together and to ground, means for periodically applying a negative bias to the respective control grids of said first and second three-electrode gas-filled tubes, the respective anodes of said first and second two-electrode gas-filled tubes being connected to the anode of said second vacuum rectifier tube, said connection of the anodes of said first and second two-electrode gas-filled tubes to the anode of said second vacuum rectifier tube causing conduction through said first and second two electrode gas-filled tubes to be responsive to the anode potential of said second vacuum rectifier tube, conduction through said first and second two-electrode gas-filled tubes causing the output potential of said rectifier bridge to be applied between the conductor of the cable being tested and the grounded metal sheath of said cable.

4. In a device for detecting faults in electrical cables of the type in which a test potential is applied between a cable conductor and a grounded cable sheath, a transformer, a primary winding on said transformer, at least one secondary winding on said transformer, a first two-electrode high voltage vacuum tube having a cathode and an anode, said cathode and said anode being respectively connected to spaced apart points of one of said secondary windings, a capacitor, said capacitor being connected in series with said anode and its point of attachment to said secondary winding, a second two-electrode high voltage vacuum tube having an anode and a cathode, the cathode of said second high voltage vacuum tube being connected to the anode of said first high voltage vacuum tube, the anode of said second high voltage vacuum tube being connected to a conductor of the cable being tested, the point of said secondary winding to which the cathode of said first high voltage vacuum tube is connected also being connected to ground, at least two three-electrode gas-filled tubes each respectively having a cathode, an anode and a control grid, said three-electrode gas-filled tubes being connected in full-wave current rectifying relation to a secondary winding on said transformer, means for periodically applying a negative bias to the respective control grids of said three-electrode gas-filled tubes, at least one two-electrode gas-filled tube connected in series with the output of said three-electrode gas-filled tubes, said two-electrode gas-filled tube having an anode and a cathode, the anode of said two-electrode gas-filled tube being connected to the anode of said second vacuum tube, conduction through said two-electrode gas-filled tube being responsive to the potential of the anode of said second vacuum tube, said two-electrode gas-filled tube serving as a switch to connect the output potential of said three-electrode gas-filled tubes between a conductor and the grounded metal sheath of the cable being tested.

GEORGE D. HARDING.
ROBERT W. BARKER.

REFERENCES CITED

The following references are of record in the file of this patent:

UNITED STATES PATENTS

| Number | Name | Date |
| --- | --- | --- |
| 2,062,960 | Barclay | Dec. 1, 1936 |